(12) United States Patent
Pegg et al.

(10) Patent No.: US 8,266,209 B2
(45) Date of Patent: *Sep. 11, 2012

(54) TEMPLATING AND PROVISIONING OF COLLABORATIVE FACILITIES FOR A DATA-AGNOSTIC COLLABORATION SERVICE

(75) Inventors: Nigel Pegg, San Francisco, CA (US); Raffaele Sena, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,656

(22) Filed: May 11, 2011

(65) Prior Publication Data

US 2011/0214074 A1    Sep. 1, 2011

Related U.S. Application Data

(63) Continuation of application No. 12/547,640, filed on Aug. 26, 2009, now Pat. No. 7,966,370.

(51) Int. Cl.
G06F 15/173        (2006.01)

(52) U.S. Cl. ............................................. 709/204

(58) Field of Classification Search ............ 709/204; 707/608, 636
See application file for complete search history.

(56) References Cited

U.S. PATENT DOCUMENTS

| | | | |
|---|---|---|---|
| 5,572,728 A * | 11/1996 | Tada et al. ....................... 1/1 |
| 6,484,196 B1 * | 11/2002 | Maurille ...................... 709/206 |
| 6,584,493 B1 | 6/2003 | Butler |
| 6,728,762 B1 * | 4/2004 | Estrada et al. ............. 709/218 |
| 6,970,812 B2 * | 11/2005 | Kamachi et al. ............... 703/6 |
| 7,136,062 B1 | 11/2006 | Butler |
| 7,167,182 B2 | 1/2007 | Butler |
| 7,224,847 B2 | 5/2007 | Zhang et al. |
| 7,237,002 B1 * | 6/2007 | Estrada et al. ............. 709/203 |
| 7,483,945 B2 * | 1/2009 | Blumofe ...................... 709/204 |
| 7,949,116 B2 * | 5/2011 | Swanson ................. 379/202.01 |
| 2009/0089379 A1 | 4/2009 | Pegg |

OTHER PUBLICATIONS

"Adobe Flash Collaboration Service Developer Guide", Acrobat.com beta, PDF creation, (Jul. 21, 2009).
"Application programming interface", Wikipedia, the free encyclopedia, http://en.wikipedia.org/wiki/Application_programming_interface, (Jul. 22, 2009).
"U.S. Appl. No. 12/547,640, Notice of Allowance mailed Feb. 11, 2011", 6 pgs.
"Web Service", Wikipedia, the free encyclopedia, http://en.wikipedia.org/wiki/Web_Service, (Jul. 23, 2009).
Whitehead, E James, et al., "WEBDAV: IETF Standard for Collaborative Authoring on the Web", IEEE Internet Computing, (Sep. 1998), 34-40.

* cited by examiner

*Primary Examiner* — David Eng
(74) *Attorney, Agent, or Firm* — Schwegman Lundberg Woessner P.A.

(57) ABSTRACT

Various embodiments herein include one or more of systems, methods, software, and/or data structures to create collaboration enabled client applications. In some embodiments, web services are provided on one or more servers that may be called by processes within client applications to facilitate collaboration within a workspace. These web services, in some such embodiments, may be properly called by an authorized user. Virtual meeting places referred to as rooms may be created dynamically and may each include one or more collaborative services. To facilitate the dynamic creation of new rooms, room templates may be provided which allow new rooms to be easily and automatically created. The room templates may store state information for the pre-existing rooms from which they are based.

15 Claims, 8 Drawing Sheets

TEMPLATING AND PROVISIONING OF COLLABORATIVE FACILITIES FOR A DATA-AGNOSTIC COLLABORATION SERVICE

CLAIM OF PRIORITY

This application is a continuation of U.S. application Ser. No. 12/547,640 filed Aug. 26, 2009, now U.S. Pat. No. 7,966,370, which is incorporated in its entirety herein by reference.

BACKGROUND

1. Field

The present disclosure relates, generally, to network-hosted conferencing, and, more particularly, to improved systems and methods for templating and provisioning collaborative facilities for a data-agnostic collaboration service.

2. Relevant Background

Use of network-hosted conferencing, such as over the Internet, has grown considerably in recent years. There are many products on the market that allow a presenter to share video and audio over a central server with many conference participants. Some of these products may also be used in a collaborative environment, such as between members of a development team. In such instances, control of a computer or computer application on one computer may be shared over a network with other users. Such products offer such functionally in a very similar manner through a server that generally utilizes a standalone client software application on each computer of each participant. Such client software may be tightly coupled to a server that receives data from one client and distributes the data other participating clients. The client software may typically be created and distributed by the same developer of the server software to minimize compatibility and security concerns between the client and server software.

SUMMARY

Various embodiments herein include one or more of systems, methods, software, and/or data structures to create collaboration enabled client applications. More specifically, embodiments described herein disclose providing virtual meeting places (referred to herein as "rooms"), and templates for dynamically creating new rooms based on pre-existing rooms. The following embodiments and aspects thereof are described and illustrated in conjunction with systems, tools, and methods which are meant to be exemplary and illustrative, and not limiting in scope. According to a first aspect, a computer-implemented method is provided that includes providing a plurality of collaboration service modules operable to provide collaboration services over a network interface between users of one or more client applications. At least one of the collaboration service modules may be operable to receive data from a first user and serve the data to at least a second user over the network interface without regard to the type of data or client application of the first user from which the data is received. The method may also include receiving data from a client application requesting the creation of a first collaboration room. A collaboration room may be a virtual meeting place for users and may include at least one collaboration service to facilitate collaboration between the users. In addition, the method may include creating the first collaboration room which includes one or more collaborative services of the collaborative service modules, the first collaboration room further including a plurality of configuration settings. The method may also include receiving data from a client application requesting the creation of a collaboration room template based on state information of the first collaboration room, the state information including the plurality of configuration settings associated with the first collaboration room. The method may further include generating the collaboration room template using the state information of the first collaboration room. Further, the method may include storing the collaboration room template in a data storage.

According to a second aspect, a system is provided that includes a server including a set of collaboration service modules operable to provide services of the collaboration service modules over a network interface. The collaboration service modules are operable to receive data from a first user and serve the data to at least a second user over the network interface without regard to the type of data or application of the first user from which the data is received. The system also includes a collaboration room library stored on a data storage medium of the server, the collaboration room library including one or more collaboration rooms. Each collaboration room may be a virtual meeting place for users and includes at least one collaboration service to facilitate collaboration between the users. The system further includes a collaboration room template library stored on a data storage medium of the server. The collaboration room template library may be operable to store a number of collaboration room templates. Each collaboration room template may include a copy of state information for a previously created collaboration room. In addition, the system includes an application programming interface module executing on the server that is operable to receive instructions from one or more client applications to create a new collaboration room. The system may further include a collaboration room generating module executing on the server that is operable to generate a new collaboration room based on a collaboration room template stored in the collaboration room template library.

According to a third aspect, an apparatus is provided that includes a computer-readable medium, with instructions which when processed by a computer, cause the computer to provide a plurality of collaboration service modules operable to provide collaboration services over a network interface between users of one or more client applications. One or more of the collaboration service modules may be operable to receive data from a first user and serve the data to at least a second user over the network interface without regard to the type of data or application of the first user from which the data is received. The instructions may also cause the computer to receive data from a client application requesting the creation of a first collaboration room. As noted above, a collaboration room may be a virtual meeting place for users and includes at least one collaboration service to facilitate collaboration between the users. The instructions may also cause the computer to create the first collaboration room which includes one or more collaborative services of the collaborative service modules, the first collaboration room further including a plurality of configuration settings. Furthermore, the instructions may cause the computer to receive data from a client application requesting the creation of a collaboration room template based on state information of the first collaboration room, the state information including the plurality of configuration settings associated with the first collaboration room. The instructions may also cause the computer to generate the collaboration room template using the state information of the first collaboration room. In addition, the instructions may cause the computer to store the collaboration room template in a data storage.

In addition to the exemplary aspects and embodiments described above, further aspects and embodiments will become apparent by reference to the drawings and by study of the following descriptions.

DETAILED DESCRIPTION

Figure 1:
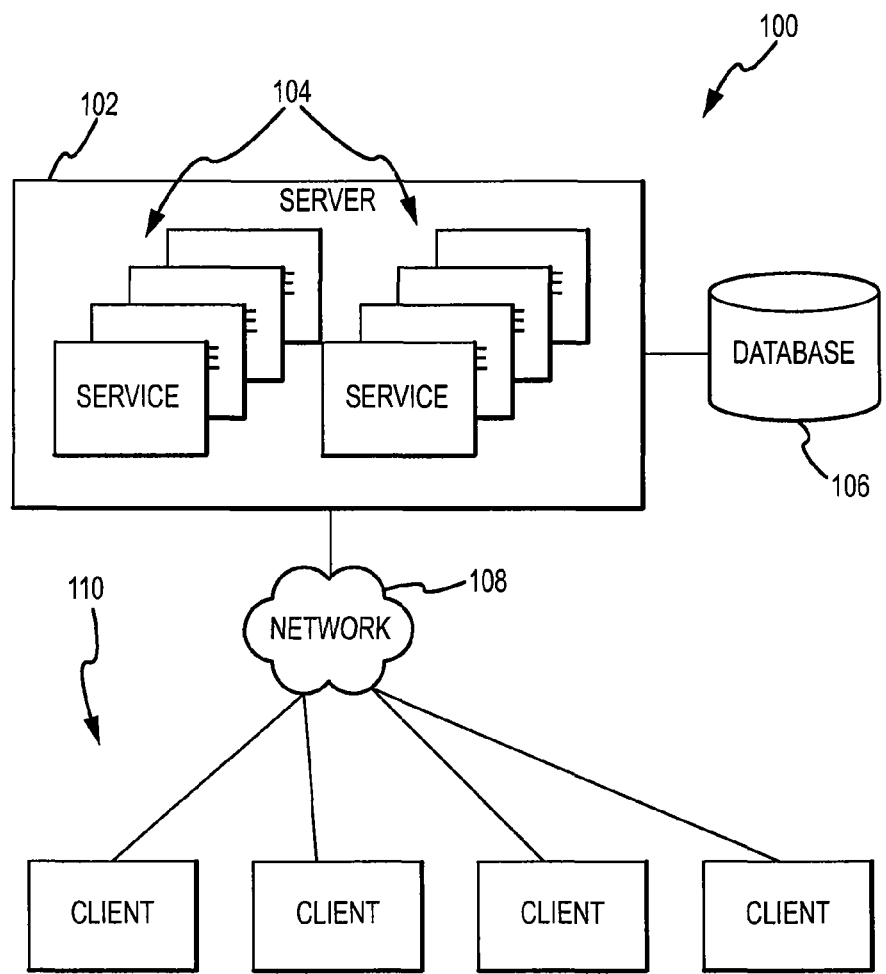
FIG. 1 is a block diagram of a system according to an exemplary embodiment.

Various embodiments herein include one or more of systems, methods, software, and/or data structures to create collaboration enabled client applications. In some embodiments, web services are provided on one or more servers that may be called by processes within client applications to facilitate collaboration within a workspace, such as directly within a computer application. Some such web services may be application and data-agnostic, meaning that such web services are not aware of or are indifferent to where application collaboration service calls come from, what their destination application is, or what data is being communicated. These web services, in some such embodiments, may be properly called by an authorized user.

Virtual meeting places referred to as "rooms" may be created dynamically and may each include one or more collaborative services. To facilitate the dynamic creation and deployment of new rooms, room templates may be provided which allow new rooms to be easily and automatically created. These room templates may store state information for the pre-existing rooms from which they are based. Such state information may include one or more collaboration services, configurations of the collaboration services, data messages that have been stored by the pre-existing room, as well as other features.

In the following discussion, systems and methods for providing templating and provisioning of collaborative facilities for a data-agnostic collaboration service are explored. First, with reference to FIGS. 1-5, an overview is provided of one type of system in which the systems and methods may be implemented. Next, with reference to FIGS. 6-8, particular embodiments of systems and methods for templating and provisioning of collaborative facilities for a data-agnostic collaboration service are described.

Although current network-hosted conferencing and collaboration tools provide many options, the utility of a conference may be limited by such tools. These tools generally fail to allow embedding of collaboration abilities within applications and web pages/sites. For example, if a first user wishes to share a view of an application with a second remote user, both of the users must launch a conferencing or collaboration specific application or website and the first user must designate which application to share. The communication of data between users must be made in a format that may be understood by processes of a central server. Further, communication between the first user and the second remote user is typically limited to image-based screen shares.

Some of the various embodiments as described herein provide systems, methods, software, and data structures that enable application and data-agnostic collaboration services. Some such application and data-agnostic collaboration services allow embedding of collaboration services within applications (e.g., web applications) to remove the need for use of separate conferencing or collaboration applications. These embodiments, and others, may provide such services by decoupling client-server communication from client-specific applications and allowing such communications to be made through web service calls to services offered by a server. In some embodiments, data may be communicated between client applications in a format that is not understood by the server, but rather is specific to the applications connected to a collaboration session. Some embodiments may also include collaboration tools embedded within applications from a set of developer tools operative with a collaboration server. These and other embodiments are described in detail below.

The functions or algorithms described herein are implemented in hardware, software or a combination of software and hardware in one embodiment. The software may include computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software may be executed on a digital signal processor, ASIC, microprocessor, or other type of processor operating on a system, such as a personal computer, server, a router, or other device capable of processing data including network interconnection devices. Some embodiments may implement the functions in two or more interconnected hardware modules or devices with related control and data signals communicated between and through the modules, or as portions of an application-specific integrated circuit (ASIC). Thus, the exemplary process flows may be applicable to software, firmware, and hardware implementations.

FIG. 1 is a block diagram of a system 100 according to an example embodiment. The system 100 typically includes a server 102 that may communicate with clients 110 over a network 108. The server 102 may offer one or more collaboration services 104 to the clients 110 through web service calls that may be sent to and received from the collaboration services 104 over the network 108.

In some embodiments, the collaboration services 104, when called or otherwise utilized, may consume, manipulate, create, or store data. This data may be stored on the server 102, on another server, in a database 106, or in another data storage location. In some embodiments, this data may include data identifying authorized users, user or organizational collaboration service subscription and usage information, configuration settings, and other data that may be consumed, manipulated, created, or stored during operation of one or more of the collaboration services 104.

The collaboration services 104 may divide functionality of collaboration applications to allow other applications (e.g., web applications executing on a client 110) to leverage collaboration functionality. This provides the potential to develop any number of different kinds of applications executing on a client 110 that may rely on the same collaboration services 104. Accordingly, a developer may conveniently add new features to an application executing on a client 110, leveraging a provided set of collaboration services 104. For example, one embodiment may provide streaming audio/video, data messaging, chat, presence, user identity, roles, and the like as services that may be leveraged by client applications.

In addition, as mentioned above, previous collaboration applications generally required that everything performed by a server be tightly bound to one specific client. To the contrary, some embodiments may include a cloud of servers, dedicated to provisioning of collaboration services, which may host collaboration rooms or sessions of virtually any client. Further, any number of variations and types of clients may be specifically built and embedded within other applications, such as a graphics editing application, a page description language view application, a word processing application, and other typical standalone application types. Some embodiments may also include provisioning of collaboration services 104 within websites allowing collaboration between team members, communication between a customer and merchant, buyer and seller, teacher and student, friends and family, and others. Thus, although termed collaboration services 104, the use of such services is not so limited. The collaboration services 104 are generally communication tools that may be embedded within applications, websites, and other codes having a capability to call and utilize web services or other objects providing the collaboration services 104.

Some embodiments may be realized with respect to two parts. Firstly, one or more servers 102 may be dedicated, in whole or in part, or may be refactored from working with a specific application to working with any kind of real-time client 110 collaboration application. Secondly, client 110 applications may be "componentized." For example, clients 110 may be broken down so that any developer who wants to build a real-time collaboration application can reutilize the specific client 110 components and include these components into client 110 applications or merge them into unique client 110 applications. By mixing and matching client 110 components, which know how to speak directly to a set of services 104, a developer may build multiple variations of client 110 applications that enable real-time collaboration or other communication. Client-side components, such as webcam, rosters, shared whiteboards, text-based chat, and the like, may be provided to developers. Each of such components may rely on their specific and dedicated web service for the respective component type.

Some such embodiments may provide a developer kit of controls or tools that may be embedded within client 110 applications and configured to communicate with the services 104 on one or more servers 102. Some embodiments, such as web-based embodiments and some stand-alone application embodiments, may include code that invokes a client plug-in, such as the Adobe™ Flash™ player available from Adobe Systems Incorporated of San Jose, Calif., or another runtime client.

Figure 2:
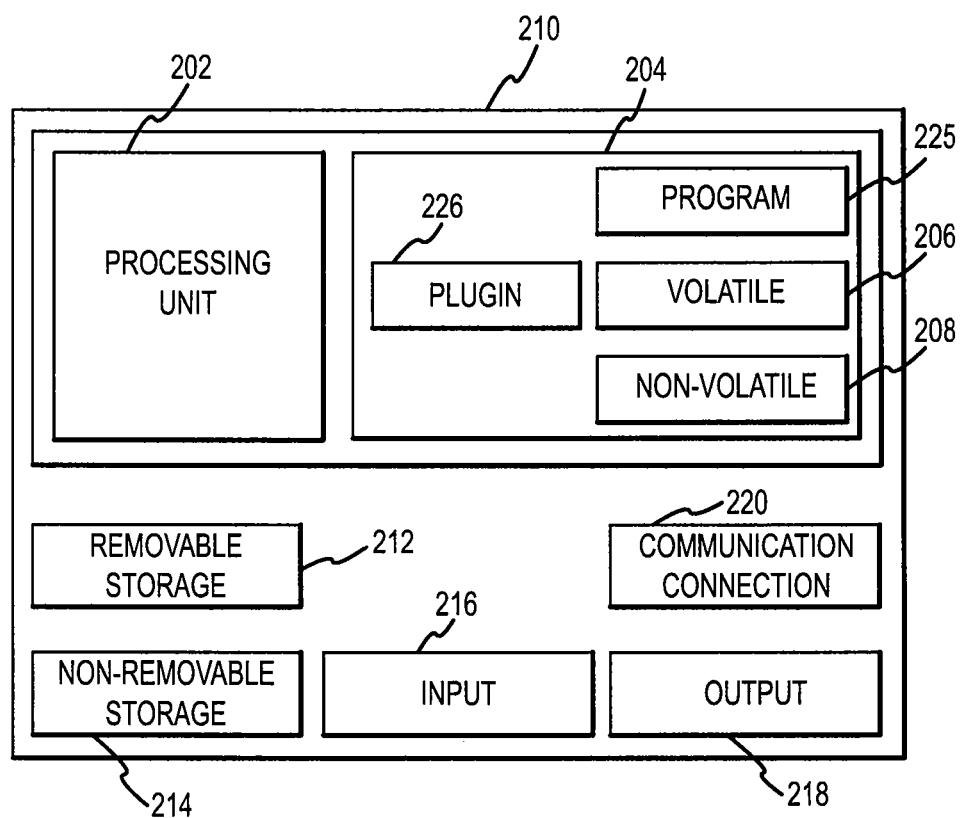
FIG. 2 is a block diagram of a client system according to an exemplary embodiment.

FIG. 2 is a block diagram of a client system 210 (e.g., the client systems 110 shown in FIG. 1) according to an example embodiment. In one embodiment, multiple such client systems 210 may be utilized in a distributed network in a collaborative application environment. A service-oriented architecture may be used to implement such services and communicate between the multiple client systems 210 and collaboration services on a server (e.g., the server 102 shown in FIG. 1). The example client system 210 in the form of a computer may include a processing unit 202, memory 204, removable storage 212, and non-removable storage 214.

Memory 204 may include volatile memory 206 and non-volatile memory 208. Client system 210 may include—or have access to a computing environment that includes—a variety of computer-readable media, such as volatile memory 206 and non-volatile memory 208, removable storage 212 and nonremovable storage 214. Computer storage may include random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Client system 210 may include or have access to a computing environment that includes input 216, output 218, and a communication connection 220. The input 216 may include one or more input devices such as a mouse, a keyboard, electronic pen type input, an audio input device such as a microphone coupled to an audio card or other dedicated audio circuit, a web cam, a screen capture program or device, or other input device. The output 218 may include a video monitor, speakers coupled to the audio card or other dedicated audio circuit, a printing device, or other output device. The client system 210 may operate in a networked environment using the communication connection 220 to connect to one or more remote computers, such as one or more servers (e.g., the server 102 shown in FIG. 1) offering collaborative services that enable collaboration between client system 210 and other remote computers. The remote computers may include one or more of a personal computer ("PC"), notebook computer, consumer electronic device (e.g., camera, camcorder, set top box, mobile device, and the like), server, router, network PC, a peer device, or other common network node, and the like. The communication connection 220 may include a Local Area Network ("LAN"), a Wide Area Network ("WAN"), the Internet, a Virtual Private Network ("VPN"), a peer-to-peer network, or other networks.

Computer-readable instructions stored on a computer-readable medium may be executable by the processing unit 202 of the client system 210. A hard drive, CD-ROM, and RAM are some examples of articles including a computer-readable medium. For example, a computer program (or application) 225 implementing collaboration services of a collaboration server by capturing one or more of data, gestures, video, audio, and the like within the computer application 225 or on the client system 210 and transmitting the captured data to a collaboration server (e.g. server 102) utilizing web service calls. The collaboration server may then replicate the data and send the data to one or more remote computers. The computer program 225 may also receive such data from the collaboration server, the data originating on one or more remote computers. Upon receipt of data from the collaboration server, the data may be parsed to identify a portion of the application 225 to which the data pertains and then the data may be evaluated to determine what to do. This may include replicating a computer program action represented in the data, replicating data, opening an audio or video stream, playing audio or video data, replicating a gesture action with a gesture tool such as a mouse, or other action or data modification, deletion, creation, or insertion. In some embodiments, the computer application 225 may leverage functionality of a plug-in 226 to perform one or more functions such as capturing, outputting, encoding, and/or decoding collaboration data. As mentioned above, the plug-in 226 may be the Adobe™ Flash™ player. However, in other embodiments, the plug-in 226 may be a custom-developed piece of software developed to implement one or more services offered by a collaboration server.

Figure 3:
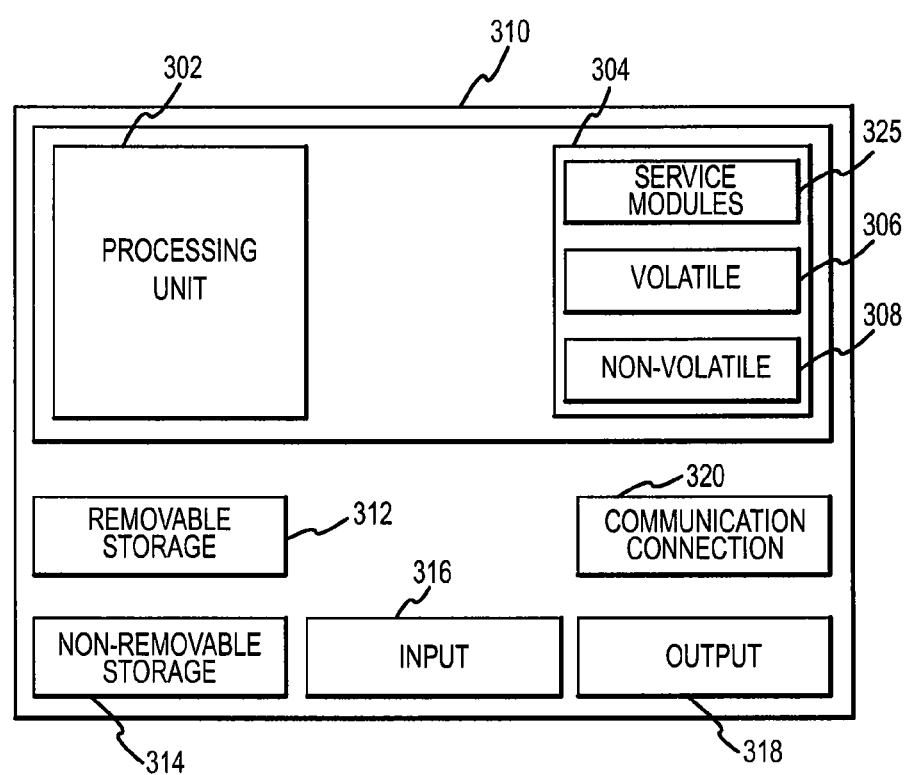
FIG. 3 is a block diagram of a server system according to an exemplary embodiment.

FIG. 3 is a block diagram of a server system 310 according to an example embodiment. In one embodiment, multiple such server systems may be utilized in a distributed network to implement multiple services in a collaborative application environment. A service-oriented architecture may be used to implement such services and communicate between multiple client systems implementing collaboration services offered by the server system 310 and potential other server systems 310, depending on the embodiment. The example server system 310 is in the form of a computer, which may include a processing unit 302, memory 304, removable storage 312, and non-removable storage 314. Memory 304 may include volatile memory 306 and non-volatile memory 308. Computer 310 may include, or have access to a computing environment that includes, a variety of computer-readable media, such as volatile memory 306 and non-volatile memory 308, removable storage 312 and non-removable storage 314. Computer storage may include random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Server system 310 may include or have access to a computing environment that includes input 316, output 318, and a communication connection 320. The computer may operate in a networked environment using the communication connection 320 to connect to one or more remote computers, such as one or more client systems 210 illustrated in and described with regard to FIG. 2. The communication connection 320 may include a Local Area Network ("LAN"), a Wide Area Network ("WAN"), the Internet, a Virtual Private Network ("VPN"), a peer-to-peer network, or other networks.

Figure 4:
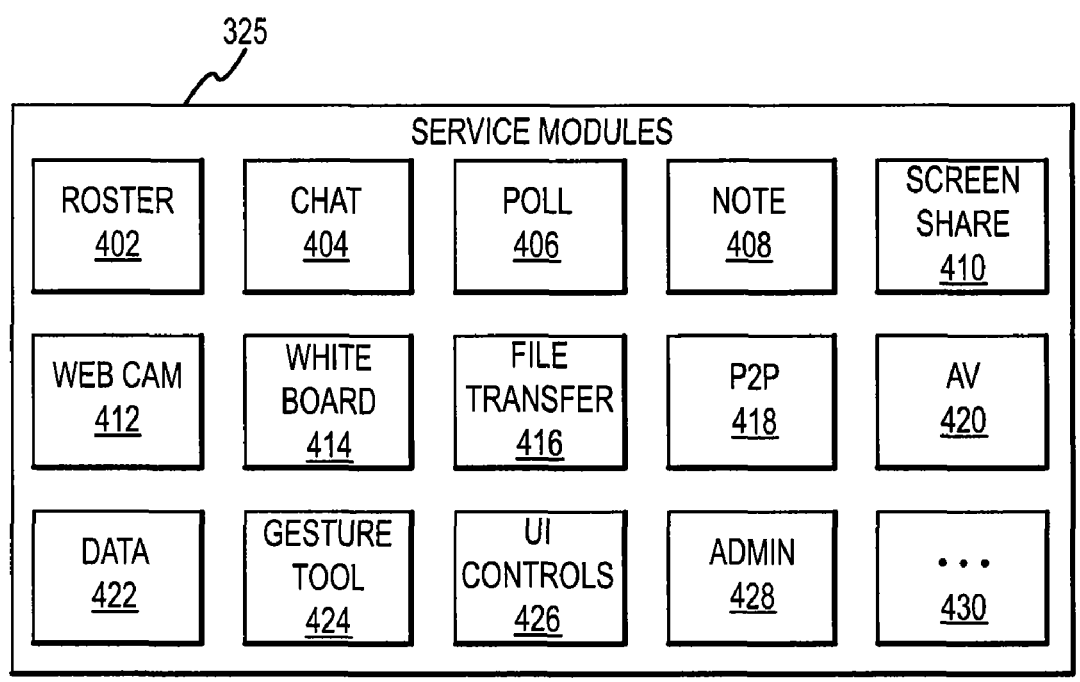
FIG. 4 is a block diagram of service modules included within a server system according to an exemplary embodiment.

Computer-readable instructions stored on a computer-readable medium may be executable by the processing unit 302 of the server system 310. A hard drive, CD-ROM, and RAM are some examples of articles including a computer-readable medium. The computer-readable medium, in an example embodiment, may include one or more service modules 325 that are operable to provide collaboration services, such as web services, to client collaboration applications (such as applications 225 shown in FIG. 2). In typical embodiments, the collaboration service modules 325 may be application and data-agnostic, meaning that the collaboration service modules 325 allow any collaboration application to call the collaboration services. The collaboration services may be a conduit for transmission of any data so long as an appropriate collaboration service is utilized. For example, a client application such as a web application may be developed to utilize a general collaboration service. The general collaboration service may only specify that data received from a first client collaboration application to be broadcast to one or more other client collaboration applications include a minimal amount of specific data when the service is called, and all other data included in the service call is just broadcast to the other client collaboration applications. Further, the collaboration services may only specify that they be called in a particular manner, such as a proper formatting of the service calls, and may not specify that they be called by a particular client application. As a result, any client application may utilize the services of the service modules 325 to collaborate with virtually any type of data the client applications may utilize. FIG. 4, and its description below, provides detail as to the services modules 325 that may be available in some embodiments.

FIG. 4 is a block diagram of service modules 325 that may be included within a server system 310, as illustrated in FIG. 3, according to an example embodiment. The service modules 325, as described above, provide services, such as web services, that may be utilized by client collaboration applications (such as application 225 shown in FIG. 2). The service modules 325 typically receive data from a first client collaboration application through a web service call and broadcast the received data to other client collaboration applications participating in a collaboration session, such as by joining a collaboration virtual meeting place or "room."

A collaboration server, such as server system 310 of FIG. 3, typically provides several collaboration services. These collaboration services may be implemented through service modules 325, which may be objects, programs, application programming interfaces (APIs), or other units of software. In some embodiments, each service is embodied in a single module. In other embodiments, multiple services are embodied in a single module. Combinations of services within modules may be made based on a class of functionality, such as by the type of data communicated through the module, the type of communication, such as inbound or outbound, or in virtually any other manner. However, in other embodiments, a single service module may include a single service that is entirely data and application agnostic. Thus, although the service modules 325 are described below as providing certain services, these services may be provided in a single module, a few modules, or many modules. The name given to the particular service modules 325 in the following description is given merely to describe the type of functionality the particular service module is provided for and is not intended to limit modules within which services may be included.

The service modules 325 may include modules to implement functionality, such as: roster 402, chat 404, polling 406, notes 408, screen sharing 410, web cam 412 or other streaming video, shared white board 414, file transfer 416, transfer of data to enable peer-to-peer ("P2P") 418 communication between two or more client applications, audio and visual 420, general data transfer 422, gesture tool 424 (such as a pointing device or cursor), user interface controls 426, administration 428, and other modules 430 depending on the embodiment. In some embodiments, the service modules 325 may be downloaded by a client to implement the functionality of the service module on the client. In such embodiments, the service modules 325 may include client-side logic to handle data that may be communicated via the collaboration server system 310 shown in FIG. 3.

A roster service module 402, in some embodiments, offers services to identify collaboration session participants and present participant information in a roster type control on one or more client collaboration applications connected to a collaboration session. The roster module 402 may also provide services to identify and implement roles of one or more collaboration session participants, such as organizer, presenter, administer, participant, and the like. Such roles may be declared using administrative services of the administration module 428.

The administration module 428 may also be used to create or schedule a collaboration session, authorize participants of a collaboration session, modify or create participant roles and permissions, declare a collaboration session as closed to a finite number of participants, certain participants, or publicly available. The chat service module 404 typically provides services that enable text-based chat between collaboration session participants. In some embodiments, the chat services may allow a participant to send a chat message to less than all of the other participants if desired. In some embodiments, based on a permissions of a certain role as declared in the administration service module 428, messages of a particular participant may be blocked from transmission to other participants, such as in the event the block participant is abusing the chat functionality. Chat messages may also be sent to an administrator for approval prior to communication to other collaboration session participants.

The polling service module 406 typically allows one participant to set up a poll for other participants to answer. The polling service module 406 may then collect the results of the poll and present them to the creator. The polling results may also be shared with one or more other participants.

The note service module 408 typically provides services that allow transmission of a note to one or more other participants. This may include a text block placed as a control on a certain portion of a shared screen view. The screen share service module 410 provides services to share a screen view of one client application with other participants. The screen share services may also allow sharing control of the screen, such as allowing one or more other participants to provide input via a keyboard and pointing device.

The web cam service module 412 typically provides services to share streaming video between collaboration session participants. In some embodiments, use of the web cam service module 412 services may be configured through services of one or more of the administration and web cam service modules to limit the number of shared video streams or allow only a presenter's video stream to be displayed. A shared video stream may also include audio.

The white board service module 414 provides services to receive and share whiteboard type input. Whiteboard input typically includes drawings made within a virtual whiteboard. As with the streaming video services described above, use of the whiteboard services may be limited to only a presenter and/or other roles.

The file transfer service module 416 typically includes services that allow one collaboration session participant to upload a file and transfer the file to all, or a select number of, other participants. For example, a file may be uploaded and designated for transmission to one or more specific participants based on identity data from the roster service module, participants having a particular role or permission level, participants in a certain department or geographic location based on data which may be stored in a location accessible to a client collaboration application or accessible by a service module service, or based on other criteria. The P2P service module 418 includes services to facilitate exchange of network connectivity data between two or more users to establish a peer-to-peer communication connection between the users over a network. In some such embodiments, once the network connectivity data has been exchanged utilizing a service of the P2P service module 418, two or more client collaboration applications may exchange collaboration data directly with one another. In some such embodiments, a collaboration session may then be conducted, in whole or in part, in a P2P fashion.

The audio/visual service module 420 includes services to exchange audio, video, and combined audio and video, such as in streams, between collaboration session participants. In some embodiments, the audio and video services may be unidirectional, meaning that audio and video of only one participant is shared at a time as set utilizing one or more services of the audio/visual service module 420 or the administration service module 428. The audio services, in some embodiments, may include Voice over Internet Protocol ("VoIP") services. Audio and visual data may also be administered to be shared only by or with certain individual participants or participants having a particular role.

The gesture tool service module 424 may include services to share gestures made by participants with an input device, such as a mouse, a cursor within an application, a highlighting tool, or other gesturing device. The user interface controls service module 426 may include services that are specific to certain user interface controls. In some embodiments, user interface control services identify a particular control within client collaboration applications and an action with regard to that control, such as "has focus," "clicked," typed text, submit, or other action.

The data service module 422 includes services to allow exchange of free-form data between collaboration applications. Such services may be data and application agnostic, meaning that the data service module 422 does not process the service calls to verify the data came from a specific type of application or that the data is of a particular type or in a particular format. These services merely require that the service be called or invoked in a proper manner. Such services allow application developers to create customized application elements and share data in a collaborative fashion between the elements. Such application elements may include elements that capture data within applications that is to be shared with collaboration session participants. Such data may include text from documents, numeric data from spreadsheets, data indicative of actions performed within an application, or other data within virtually any other application. In some embodiments, the data services may be embedded within an application in a manner that is not visible, or otherwise apparent to a user. This data, once captured, may be transmitted using the services of the data service module 422 and communicated to other participants. The other participants may receive this data and the application will handle the data as specified by a developer of the application. Thus, using the services of the data service module 422, custom applications may be developed with customized collaboration features to capture data and actions and receive and process or display those actions within application instances of collaboration session participants. It is noted that, in some embodiments, the applications of collaboration session participants do not need to be identical applications. What may be desired is that the respective applications of the participants be enabled to communicate utilizing the services of the service modules 325 of the server system 310 illustrated and described with regard to FIG. 3 and FIG. 4.

Figure 5:
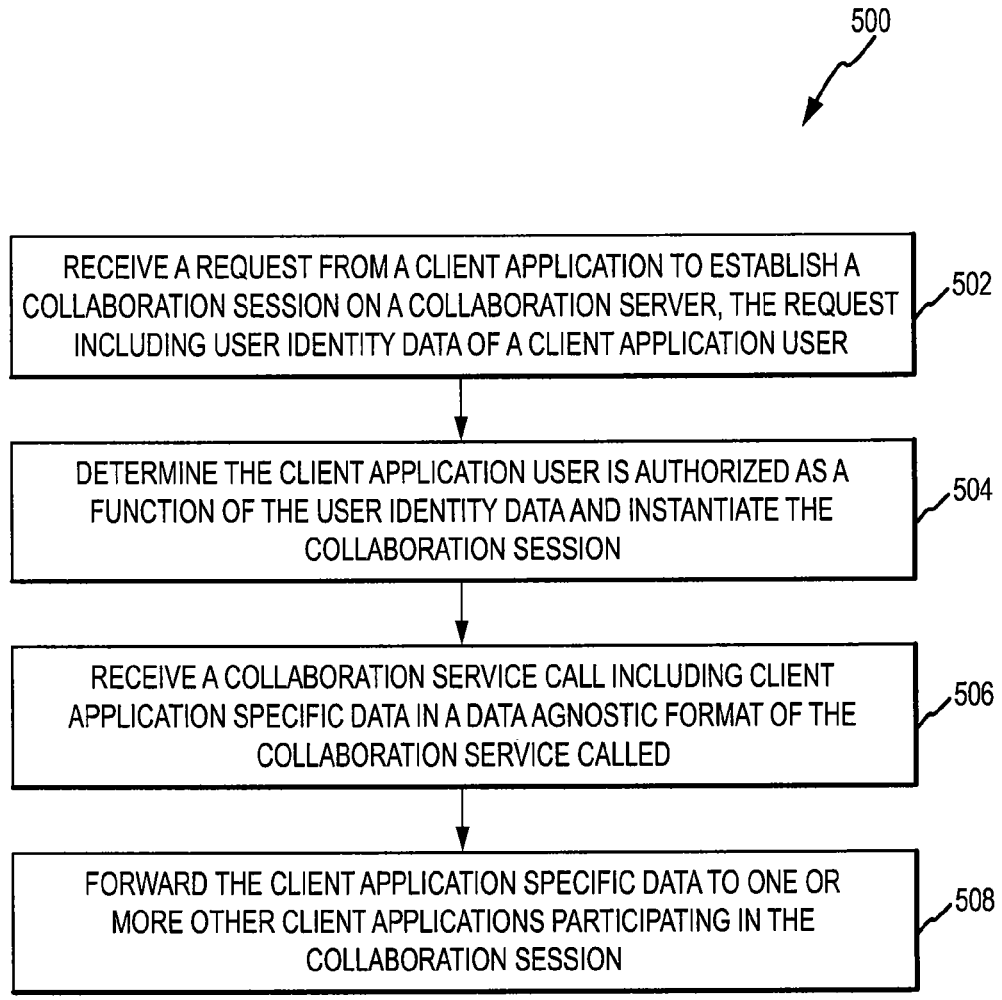
FIG. 5 is a block flow diagram of a method according to an exemplary embodiment.

FIG. 5 is a block flow diagram of a method 500 according to an example embodiment. The method 500 is an example of a method that may be implemented on a server (e.g., by the processing unit 302 of the server 310 shown in FIG. 3) providing one or more collaboration services to client applications (e.g., the client application 225 shown in FIG. 2). In some embodiments, the method 500 may include receiving a request from a client application to establish a collaboration session on a collaboration server, the request including user identity data of a client application user, step 502. The method 500 may further include determining whether the client application user is authorized as a function of the user identity data and instantiating the collaboration session, step 504. After instantiating the collaboration session, which may also be considered a virtual meeting room, the method 500 includes receiving a collaboration service call including client application specific data in a data-agnostic format of the collaboration service called, step 506, and forwarding the client application specific data to one or more other client applications participating in the collaboration session, step 508. The collaboration server in typical embodiments need not be aware of the type of client application requesting the collaboration session; rather, the collaboration server may ensure the collaboration services are invoked in a proper manner.

In some embodiments of the method 500, receiving the request from the client application to establish the collaboration session, step 502, may include receiving a first web service call from the client application to establish the collaboration session and receiving a second web service call to authorize one or more other users to participate in the collaboration session. Such embodiments may further include receiving one or more third web service calls to designate permissions of the one or more other users authorized to participate in the collaboration session.

In some embodiments of the method 500, the collaboration session facilitates collaboration between client applications through a set of web services including functionality and data specific web services and one or more data-agnostic web services. The one or more data-agnostic web services, when called, may receive data from a client application participating in the collaboration session. A called web service may then forward the data to one or more other client applications participating in the respective collaboration session.

Some further embodiments may include a system having a server (such as the server 310 shown in FIG. 3). The server may include a set of collaboration service modules operable to provide services of the collaboration service modules over a network interface, such as a network interface card. The collaboration service modules may typically be operable to provide one or more of user identity, role and permission, and presence services and one or more services to share client application data between applications of two or more clients authorized to utilize the services. At least one collaboration service may be operable to receive data from a first user and serve the data to at least a second user over the network interface without regard to the type of data or an application of the first user from which the data is received. Additional collaboration service modules may be operable to provide one or more of audio and video sharing services, text-based messaging services between two or more users, shared whiteboard services, collaboration session (or room) management services operable to allow a meeting organizer to create and administer settings of a networked based conference. Some of these embodiments, and others, may also include roster services that provide a listing to one or more users of all users connected to the server or to a particular collaboration session. Some embodiments of the server may also provide file transfer services to facilitate transfer of an electronic data file from one user to one or more other users connected to the server, such as one or more users participating in a particular collaboration session.

In some embodiments, the room management services allow a meeting organizer to define policies such as policies that may authorize users to connect to a network-based conference and designate permissions of the authorized users. Permissions of authorized users in some such embodiments may be set on a service-based level to allow or prevent utilization of services of the collaboration service modules individually or as a whole. In some embodiments, a user is a human user of a collaboration service-enabled client application. However, a user need not be a human user. The collaboration services offered by a server may be leveraged by processes within an interactive server, such as a web server or other interactive computing process. In such embodiments, the collaboration services may be utilized as middleware messaging services. In some embodiments, a meeting organizer, or other designated administrator or developer, may define or modify policies regarding how data of a network-based conference is stored. Such policies may cause networked-based conference data to be made available across multiple sessions, be merely transient and not logged or stored, persisted during a conference or for a period and then deleted, recorded and stored indefinitely, or other duration which may be desired and specified in a policy.

Some embodiments may include a system having a local application including instructions to establish and maintain a network connection with one or more remote applications for exchanging data. Such embodiments typically include establishing and maintain the network communication connections via calls of one or more services offered by one or more collaboration servers without regard to the type of exchanged data or local or remote applications. The local application and the one or more remote applications may be separate instances of the same application. The local application and the one or more remote applications may each include one or more collaboration tools embedded therein, such as a shared whiteboard module, chat module, or module that may be needed to communicate with one or more of the services. In some embodiments, one or more collaboration tools, such as a shared whiteboard, chat window, roster, and the like may be included within a plug-in that may be called by a collaboration-enabled application.

In some embodiments, data exchanged between a collaboration-enabled client application and a collaboration server may be communicated in a data structure. The data structure, in one embodiment, may include a wrapper portion identifying a web service being called, or otherwise being utilized, such as a data-agnostic web service. The data structure may further include a data portion. The data portion may include data identifying a collaboration session for which the data structure pertains and a web service data portion holding data that to be distributed by the called collaboration web server to other participants of the collaboration session or to be displayed or otherwise processed by the collaboration-enabled applications of the other participants. In some embodiments, the web service data portion holds free-form data including data from an originating client application to be communicated to other participant client applications of the collaboration session. The free-form data may be data of a custom developed collaboration tool included within collaboration enabled client applications. The data portion may further include data identifying a user of the originating client application.

Figure 6:
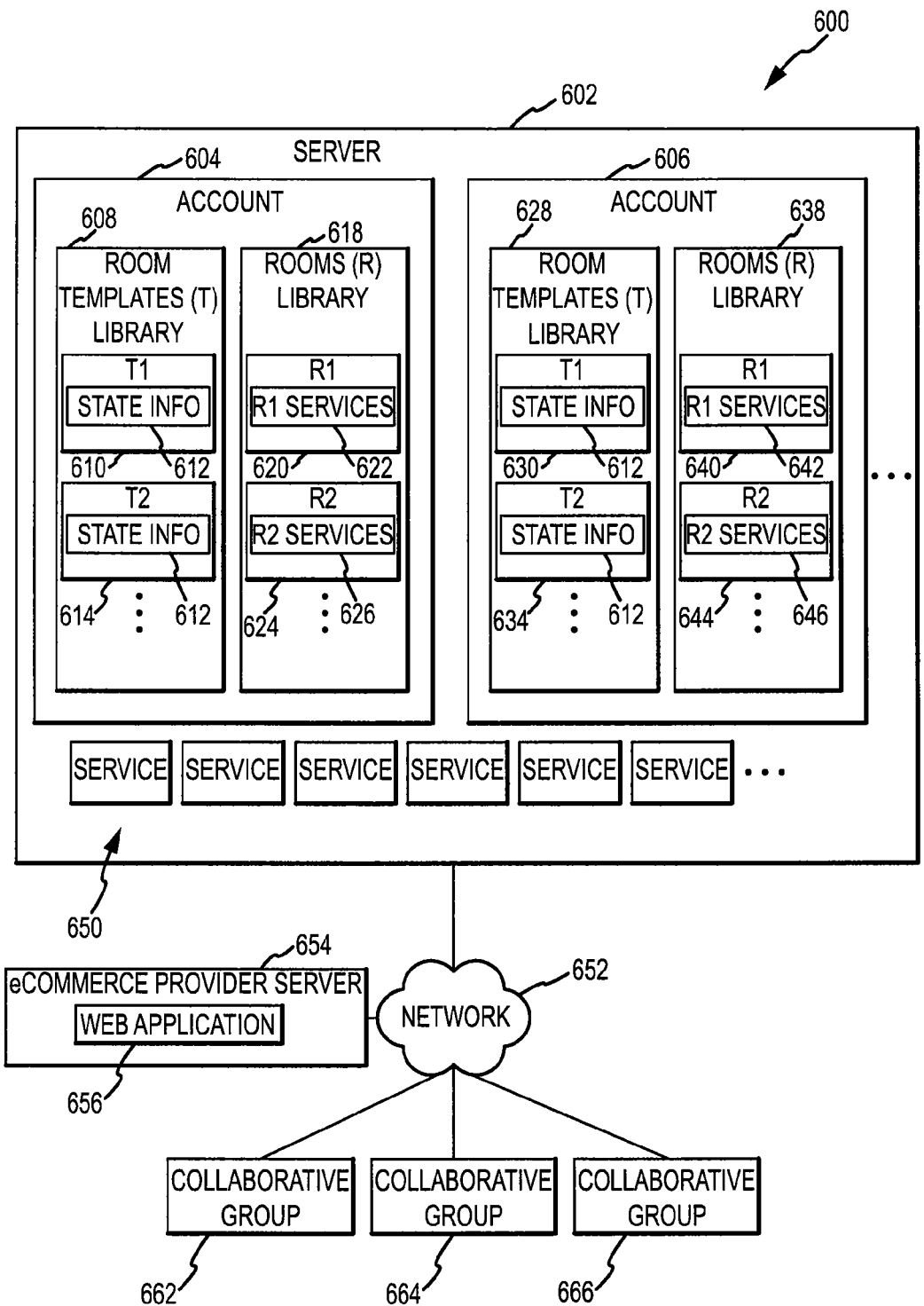
FIG. 6 is a block diagram of a system according to an exemplary embodiment.

FIG. 6 is a block diagram of a system 600 according to an exemplary embodiment. The system 600 includes a collaboration services server 602 that may communicate with one or more developer servers, such as an e-commerce provider server 654, over a network 652. The collaborations services server 602 may offer one or more collaboration services 650 to one or more web applications 656 executing on the e-commerce provider server 654 through web service calls that may be sent to and received from the collaboration services over the network 652. Further, a number of collaborative groups (e.g., collaborative group 662, collaborative group 664, and collaborative group 666) may each include a plurality of users interacting with instances of web applications 656 (e.g., using a web browser coupled to the e-commerce provider server 654 through the network 652).

In this example, an e-commerce provider operating the e-commerce provider server 654 may wish to permit groups of users to collaboratively design a product (e.g., a shoe, a car, other clothing, and the like). Of course, the system 600 may also be used for other collaborative services that allow collaboration between team members, communication between a customer and a merchant, buyer and seller, teacher and student, friends and family, and others.

A developer associated with the e-commerce provider may configure the web applications 656 to provide conference sessions or rooms for each of the collaboration groups 662, 664, 666. A room may generally be a virtual location on the collaborations services server 602 to which web applications 656 may connect. Users of web applications 656 connected to a room may send and receive messages (data) to anyone else in the room. The rooms may generally be thought of as meeting places at a specific uniform resource locator (URL). The rooms may include one or more collaboration services 650 that are pre-configured by the developer of the e-commerce provider server 654 and provided by the collaboration services server 602. The services 650 may be collaboration services shown in FIG. 4, as well as other services.

The collaboration services server 602 may store a plurality of accounts (such as account 604, account 606) that include information for a particular client. For example, the account 604 may correspond to the e-commerce provider server 654. Each account may store a plurality of rooms (e.g., room 81620 and room R2 624 in account 604 and room 81640 and room R2 644 in account 606) and their associated services (e.g., services 622, 626 for account 604 and services 642, 646 for account 606), as well as other data associated with the rooms in a room library (e.g., the room libraries 618, 638). Each of the rooms may be associated with a particular collaboration group, such as one of the collaboration groups 662, 664, or 666. Each of the accounts stored on the collaboration services server 602 may also include a room template (T) library, such as the room template library 608 for account 604 or the room template library 628 for account 606. Each room template library may include one or more room templates (e.g., T1 610 and T2 614 for account 604 and T1 630 and T2 634 for account 606) that each include state information 612 that may include a plurality of services, configurations for the services, data messages, or other data. A room template may be a saved room configuration which includes services, configurations for services, room settings, or other data of a previously-created room. Generally, state information 612 for existing rooms may be saved in a room template library so that new rooms may be automatically created based on room templates with predefined features.

As can be appreciated, by using templates, a developer may not be required to create a room manually each time a new room is needed. Further, a developer of the web applications 656 may control (e.g., manually or programmatically) how and when new rooms are created as well as their properties. In this regard, users associated with collaboration groups may be restricted from creating new rooms or adding services to a room without permission. For example, multiple users forming a group of users (e.g., collaboration group 662) may each execute an instance of the web application 656, such that they may collectively design a product. The e-commerce provider server 654 may in turn notify the collaboration services server 602 (e.g., programmatically) that a new room is to be created for the collaboration group 662, and the notification may specify which predefined room template stored in a room template library (e.g., room template library 608 or 628) to use to create the new room. In this regard, it may not be necessary to specify all of the services and configurations for each new room. As can be appreciated, this feature may be desirable in applications where many rooms having similar or identical features may be created dynamically. For instance, in an example application, hundreds or thousands of collaboration groups may wish to design a particular product, and, in this example, many similar or identical rooms may be dynamically creates as new collaborative groups participate. Further, in addition to including services, configurations for services, and room settings, the room templates (e.g., T1610, T2 614, and others) may also include state information 612 about specific collaboration functionality related to the domain in which users may want to collaborate. For example, a room template used for rooms for designing a car may include state information 612 that includes detailed data manipulation services pertaining to the make, model, and design, of cars.

Figure 7:
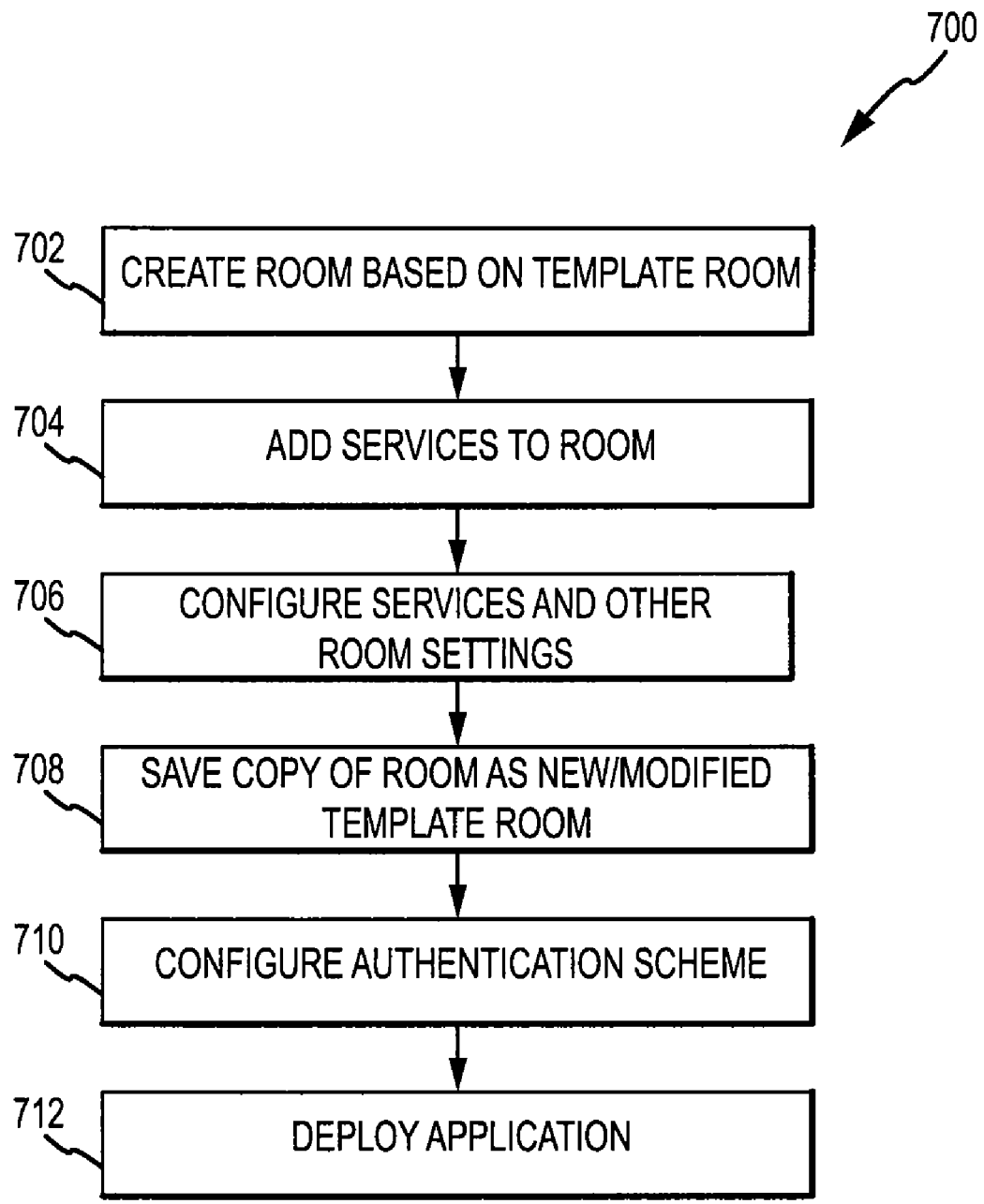
FIG. 7 is a block flow diagram of a method according to an exemplary embodiment.

FIG. 7 illustrates a block flow diagram of a method 700 for developing an application according to an exemplary embodiment. As an example, the application may be a web application, such as the web application 656, executing on a developer's server such as the ecommerce provider server 654 shown in FIG. 6. Generally, the method 700 involves creating rooms, templating new rooms, and deploying applications with functionality to dynamically create new rooms based on room templates.

Initially, the method 700 includes creating a room based on a template room, step 702. If this is the first room created, the template room may be a default template room which may have little or no components or configuration settings (e.g., a "blank" or empty template room). Next, one or more services may be added to the room, step 704. For example, a chat service, note service, whiteboard service, and other services may be added to the room. Further, various configurations or other settings for the newly created room may be applied, step 706. For example, in the case of a whiteboard service, the size, fonts, positioning on a graphical user interface (GUI), or other settings may be configured. Additionally, configuration settings may include permission settings which allow users to perform various functions (e.g., post messages, add/edit/or delete content, or the like) dependent upon their credentials. As another example, the configuration settings may include audio/visual settings (e.g., layout), user interface settings, or other configuration settings which may be desired for individual applications.

Next, a copy of the configured room may be saved on a data storage of a collaboration services server, such as the collaboration services server 602 shown in FIG. 6, step 708. As can be appreciated, this copy may be stored in a room template library where it may be used as a template for new rooms to be dynamically created in the future.

Next, the method may include configuring an authentication scheme to be used with the application, step 710. Generally, a developer may decide whether to require some form of authentication for users to access rooms. Developers could allow anyone to join (e.g., as a guest), or may leverage existing systems and authentication workflows to direct users to appropriate rooms and assign permissions based on their individual credentials. An example of an authentication scheme is described below with reference to FIG. 8. Finally, once rooms and room templates have been created for the application, and an authentication scheme has been chosen, the new application may be deployed so that users may use the application, step 712. As can be appreciated, once room templates have been created, new rooms may be dynamically created by the collaboration services server using the template rooms as needed by client applications. Further, as noted above, users associated with collaboration groups may be restricted from creating new rooms or adding services to a room without permission.

Figure 8:
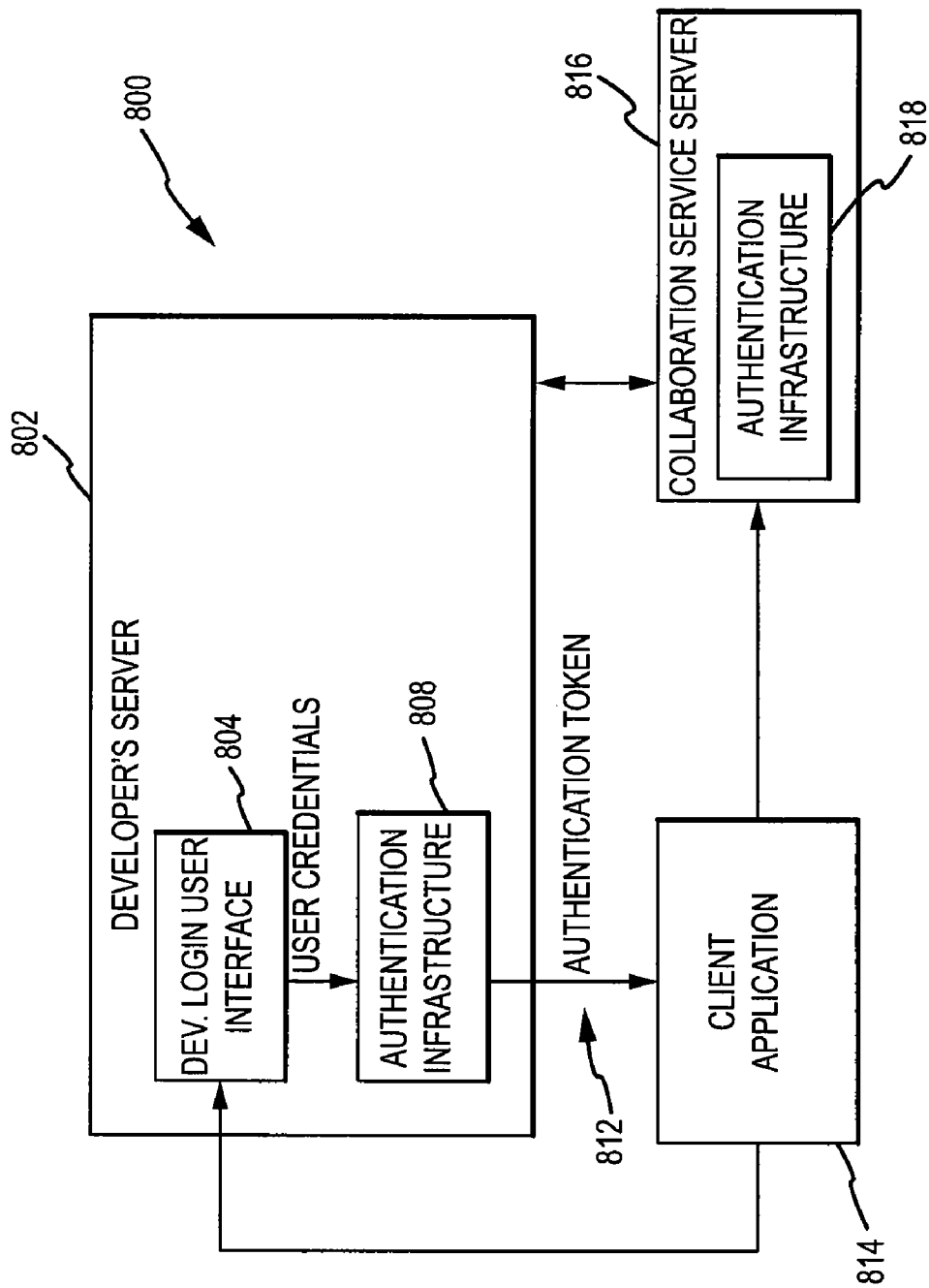
FIG. 8 is a block diagram of an authentication scheme according to an exemplary embodiment.

FIG. 8 illustrates a block diagram for implementing an external authentication scheme 800. This authentication scheme may be utilized in cases where developers already require users to authenticate on their own systems (e.g., the e-commerce provider server 654 shown in FIG. 6). In this case, it may be convenient to utilize the authentication infrastructure already in place. Advantageously, users of the web applications may log in (or otherwise provide credentials) to the developer's system as usual and thereby access collaboration services stored on a collaboration services server (e.g., the collaboration services server 602 shown in FIG. 6) in a transparent and seamless fashion. Further, end users may not need to have credentials to access the collaboration services server directly, and therefore may remain anonymous to the collaboration services server.

As shown, a developer's server 802 may include an authentication infrastructure 808 that controls the authentication of users interacting with applications. In this example, the developer's server 802 may correspond to the e-commerce provider server 654 shown in FIG. 6. Further, a collaboration service server 816 (similar to the collaboration services server 602 shown in FIG. 6) may be communicatively coupled to the developer's server 802 through a network. A client application 814, such as a web application, may also be provided wherein users may execute instances of the client application 814 (e.g., using a web browser or locally on a computer) to perform functions that include collaborating with each other.

In operation, a user of the client application 814 may supply credentials to the authentication infrastructure 808 through a developer's login user interface 804 of the developer's server 802. In response, the authentication infrastructure 808 may generate an authentication token 812 and provide the authentication token 812 to the client application 814. The token 812 may be a unique string that includes information about the developer's credentials for accessing the collaboration services server 816, the user's user ID and user-name, and other information about the user.

After the client application 814 has received the unique authentication token 814, the user of the client application 814 may then have access to an appropriate room with the specified role and associated permissions by authenticating on an authentication infrastructure of the collaboration services server 816.

One scenario may include admitting users to rooms based on who they are and what type of room they require. By utilizing templates along with authentication mechanisms already in place, users may be sent to appropriate rooms with appropriate privileges. For example, in the case where users have a single login for an application, the services provided by the collaboration services server 816 may be used (e.g., through scripts) to automatically send users to the correct rooms with appropriate permissions.

It should be appreciated that most applications may create new rooms programmatically (as opposed to manually) since it may be easier for the server to manage room creation, user access, and the like. For example, in applications including hundreds or thousands of rooms, it would not be practical to manually create each individual room. Therefore, developers may simply write programming scripts that automatically generate new rooms based on room templates according to characteristics of users of the client applications.

While this specification contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A computer-implemented method comprising:
   receiving a first request to create a collaboration room, the collaboration room being a virtual meeting place for a plurality of users and including a collaboration service to facilitate collaboration between the plurality of users;
   creating the collaboration room that includes state information, wherein the state information includes a plurality of configuration settings associated with the collaboration room;
   receiving a second request to create a collaboration room template based on the state information of the collaboration room;
   generating the collaboration room template using the state information of the collaboration room;
   storing the collaboration room template in a data storage;
   receiving a third request to create an additional collaboration room based on the collaboration room template; and
   creating the additional collaboration room based on the collaboration room template.

2. The computer-implemented method of claim 1, further comprising:
   permitting a user of a client application to access the second collaboration room dependent on a credential provided by the client application.

3. The computer-implemented method of claim 1, wherein the state information includes data messages associated with the collaboration room.

4. A server comprising:
   a collaboration service module operable to provide collaboration services over a network interface;
   a room library stored on a data storage medium accessible by the server, the room library operable to store a collaboration room, the collaboration room being a virtual meeting place for a plurality of users and including at least one of the collaboration services provided by the collaboration service module to facilitate collaboration between the plurality of users;
   a collaboration room template library stored on a data storage medium accessible by the server, the collaboration room template library operable to store a collaboration room template, the collaboration room template including a copy of state information for a previously created collaboration room stored in the room library, the state information including a plurality of configuration settings associated with the previously created collaboration room;

an application programming interface module hosted on the server and operable to receive instructions to create a new collaboration room to be stored in the room library; and a collaboration room generating module hosted on the server and operable to generate the new collaboration room based on the collaboration room template stored in the collaboration room template library.

5. The server of claim 4, wherein the application programming interface is operable to receive instructions that are generated automatically by program code executing on a client application coupled to the server through the network interface.

6. The server of claim 4, further comprising:
an authentication module hosted on the server and operable to permit a user of a client application to access the collaboration room dependent on a credential provided by the client application.

7. The server of claim 4, wherein the plurality of configuration settings include at least one of: audio/visual settings; permissions settings; and configuration settings for the collaboration service module associated with the collaboration room.

8. The server of claim 4, wherein the state information further includes configuration information about the collaboration service module associated with the collaboration room.

9. The server of claim 4, wherein the application programming interface module is operable to receive a service call from a client application, wherein the at least one collaboration service is embedded into the client application.

10. The server of claim 4, wherein the collaboration service module is operable to provide at least one of:
audio and video sharing;
text-based messaging services between the plurality of users;
shared whiteboard services;
room management services operable to allow a meeting organizer to create and administer settings of a network-based conference;
roster services that provide a listing to at least one of the plurality of users; and
file transfer services to facilitate transfer of an electronic data file.

11. A non-transitory computer-readable medium, with instructions which when processed by a computer, cause the computer to perform operations comprising:
receiving a first request to create a collaboration room, the collaboration room being a virtual meeting place for a plurality of users and including a collaboration service to facilitate collaboration between the plurality of users;
creating the collaboration room that includes state information, wherein the state information includes a plurality of configuration settings associated with the collaboration room;
receiving a second request to create a collaboration room template based on the state information of the collaboration room;
generating the collaboration room template using the state information of the collaboration room; and
storing the collaboration room template in a data storage;
receiving a third request from a client application to create an additional collaboration room based on the collaboration room template; and
creating the additional collaboration room based on the collaboration room template.

12. The computer-readable medium of claim 11, further comprising instructions, which when processed by a computer, cause the computer to perform operations comprising:
receiving authentication information from a client application; and
providing the client application with access to the collaboration room dependent on the authentication information.

13. The computer-readable medium of claim 11, wherein the state information includes information about a collaboration functionality related to a domain in which the plurality of users is to collaborate.

14. The computer-readable medium of claim 11, further comprising instructions, which when processed by a computer, cause the computer to perform operations comprising providing a collaboration service module operable to provide the collaboration service over a network interface between the plurality of users.

15. The computer-readable medium of claim 14, wherein the collaboration service module is operable to receive data from a user of the plurality of users and serve the data to a different user from the plurality of users over the network interface without regard to a type of the data or a client application of the user from which the data is received.

* * * * *